No. 646,730. Patented Apr. 3, 1900.
W. P. FREEMAN.
WHEEL DRIVING GEAR.
(Application filed May 3, 1899.)
(No Model.)
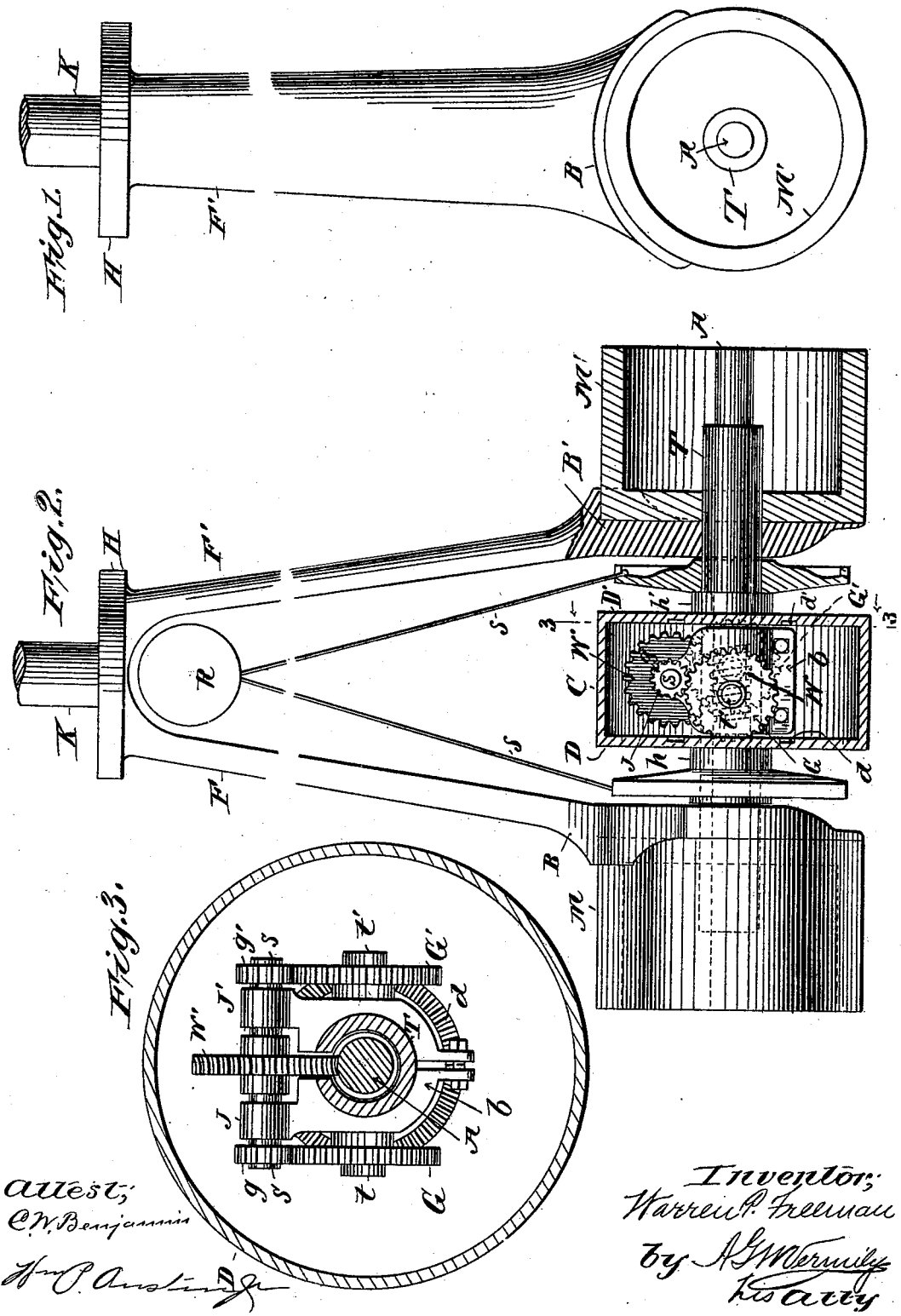
Inventor:
Warren P. Freeman
by A.G. Vermilya
his atty
Attest:
C. W. Benjamin
Wm. P. Austin Jr.

UNITED STATES PATENT OFFICE.

WARREN P. FREEMAN, OF NEW YORK, N. Y., ASSIGNOR TO THE EMPIRE ELECTRICAL MACHINERY COMPANY, OF SAME PLACE.

WHEEL DRIVING-GEAR.

SPECIFICATION forming part of Letters Patent No. 646,730, dated April 3, 1900.

Application filed May 3, 1899. Serial No. 715,402. (No model.)

*To all whom it may concern:*

Be it known that I, WARREN P. FREEMAN, a citizen of the United States, and a resident of New York city, in the county of New York and State of New York, have invented certain new and useful Improvements in Wheel Driving-Gear, of which the following is a specification, reference being had to the accompanying drawings, forming part of the same, in which—

Figure 1 is a side elevation of a wheel-frame and a field-magnet, a tube, and an axle adapted for use in a combination exhibiting my invention. Fig. 2 is a front elevation, partly in section, of a portion of the full combination of special devices I employ. Fig. 3 is a vertical sectional view on line 3 3 of Fig. 1, showing, on an enlarged scale, the system of gears I find most useful.

My invention relates to wheels; and it consists in the devices and combinations of devices herein described and claimed, by means of which power may be applied to turn them, and it relates especially to the arrangement of such means whereby compactness and convenience of application are accomplished.

In the drawings, first, there is a frame adapted to support a vehicle-wheel, its form and construction being devised to meet that purpose. The frame for other forms of wheels, or wheels for other purposes, would vary according to the intended use. As shown, there is a head H, adapted to support a vehicle or some portion thereof upon it, and a king-pin or upright rod K, projecting upward therefrom. Forks F F' extend downward from the under face of said head and swell into brackets B B', in which the other parts are mounted. Extending through these brackets is a tube T, constituting a bearing for the wheel proper. It is secured to the brackets, so as to be rigidly held thereby. At the outer ends this tube carries field-magnets M M', which may be also bolted or otherwise secured to the brackets to assure their retention in position. An axle or shaft A extends through tube T, and on it the armatures of the magnets M M' may be mounted.

Between the forks F F' on tube T, I mount the hubs $h$ $h'$, from which spokes $s$ extend to the rim R of the wheel. On said tube T, I also mount two disks D D', formed on or secured to the hubs $h$ $h'$, respectively, so as to revolve with them about the tube T, which thus becomes their axle. These disks are preferably connected by a cylindrical inclosing casing C, which excludes dirt and protects the inclosed machinery about to be described.

The axle A for a distance between the line of disks D D' is provided with a worm-thread W, and the tube T is slotted at the top to permit a worm-wheel W' to extend down to and engage the threads of axle A. Surrounding a part of the tube T, between the disks, is a bushing $b$, provided with bearings $j$ $j'$ and trunnions $t$ $t'$. The bearings $j$ $j'$ carry a short shaft S, on which I mount the worm-wheel W' and also two gear-wheels $g$ $g'$, one on either side of the center, and the trunnions $t$ $t'$ carry other gear-wheels G G', which mesh, respectively, with the wheels $g$ $g'$, as shown. It will be noticed that the centers of the trunnions are evenly offset from a vertical line drawn from the center of shaft S, which arrangement enables me to use gears of even size and pitch without having them interfere with the motion of the parts to be driven.

On the inner face of disks D D', respectively, are gear-wheels $d$ $d'$, the teeth of gear $d$ engaging the teeth of gear G and the teeth of gear $d'$ engaging the teeth of gear G'.

The operation of the device is as follows, assuming the motor to be fully equipped: The current being turned onto the motor the armatures begin to turn, carrying axle A around with them. Any other power applied to axle A would of course have the same effect. As axle A turns the worm-threads W, engaging wheel W', turn that and its shaft S as well, which thereupon rotates the gears $g$ and $g'$, and their motion is transmitted by gear G to disk D by means of gear-wheel $d$ on its face and by gear G' (on the other side) to disk D' by means of gear-wheel $d'$ on the inner face of D'; but as the diameter of gear-wheels G and G' is not equal to the distance from disk D to disk D' gear G does not touch D' nor gear G' disk D, and therefore their action, though coincident, is independent. These gears G and G' being on opposite sides of the common axis of disks D and D' would naturally tend to turn them in opposite directions; but inasmuch as the engagement between gear G and disk D is on one side of the axis of gear G and that between gear G' and disk D' is on the opposite side of the axis of gear G, as well as gear G', the resultant motions of the two disks D and D' will be similar both in direction and speed. Moreover, the force is applied by gear G in a downward direction on one side of the axis of the wheel proper and by the gear G' in an upward direction on the opposite side of the axis of the wheel proper, thereby to an extent equalizing the pressure upon the bearings and lessening the friction. Again, the machinery for transmitting the motion of axle A to disk D or D', or both, being easily inclosed by the cylinder C it may be conveniently protected, and the cylinder, together with the disks, constitute a box-casing which may be filled with oil for lubricating the inclosed parts with very beneficial results.

What I claim as my invention, and desire to secure by Letters Patent, is—

1. The combination of a frame, a hollow tube mounted in said frame, a rotary shaft within said tube, a gear within said tube and upon said shaft, there being an opening in said tube over said gear, a further gear whose engaging face enters the opening in the tube and engages the gear upon the shaft, a wheel mounted upon said tube, and a series of gears intermediate the said further gear and said wheel, whereby the application of power to the shaft will revolve said wheel.

2. The combination of a frame, a hollow tube mounted in said frame, a rotary shaft within said tube, a gear upon said shaft, there being an opening in said tube over said gear, a wheel mounted upon said tube, two disks mounted upon said tube and secured to the hub of the wheel, each disk provided with a gear, and a series of gears intermediate said shaft-gear and said disk-gears, whereby the application of power to the shaft will revolve said wheel.

3. The combination of a frame, a hollow tube mounted in said frame, a rotary shaft within said tube, a gear upon said shaft, there being an opening in said tube over said gear, a wheel mounted upon said tube, two disks mounted upon said tube, secured to the hub of the wheel and provided with gears and a series of gears intermediate said shaft-gear and said disk-gears, together with a casing extending from one disk to the other and inclosing said series of gears whereby the application of power to the shaft will revolve said wheel.

4. The combination of a frame, a hollow tube mounted in said frame, a rotary shaft within said tube, a gear upon said shaft, a longitudinal opening in said tube over said gear, a second gear entering said longitudinal opening and engaging the gear upon the shaft but with its axis at an angle to the axis of rotation of such shaft, a wheel mounted upon said tube and a series of gears intermediate said wheel and said second gear whereby the application of power to the shaft will revolve the wheel.

5. The combination of a frame, a hollow tube mounted in said frame, a rotary shaft within said tube, a gear upon said shaft, there being an opening in said tube over said gear, a wheel mounted upon said tube, two disks mounted upon said tube, secured to the hub of the wheel and provided with a worm-wheel meshing with the axle-gear and turning pinions which mesh respectively with gears having different axes, one of which meshes with one disk-gear on one side and the other of which meshes with the other disk-gear upon the other side, whereby the application of power to the shaft will revolve said disk-gears.

Signed at New York, in the county of New York and State of New York, this 17th day of April, A. D. 1899.

WARREN P. FREEMAN.

Witnesses:
PETER B. VERMILYA,
A. G. N. VERMILYA.